(12) United States Patent
Lentz et al.

(10) Patent No.: US 12,547,206 B2
(45) Date of Patent: Feb. 10, 2026

(54) CLOCK SIGNAL MONITORING UNIT

(71) Applicant: NXP B.V., Eindhoven (NL)

(72) Inventors: Andreas Lentz, Buchholz (DE); David Paul Price, Totton (GB)

(73) Assignee: NXP B.V., Eindhoven (NL)

( * ) Notice: Subject to any disclaimer, the term of this patent is extended or adjusted under 35 U.S.C. 154(b) by 69 days.

(21) Appl. No.: 18/640,347

(22) Filed: Apr. 19, 2024

(65) Prior Publication Data

US 2024/0353888 A1    Oct. 24, 2024

(30) Foreign Application Priority Data

Apr. 19, 2023   (EP) ..................................... 23168733

(51) Int. Cl.
| | | |
|---|---|---|
| *G06F 1/10* | (2006.01) | |
| *G06F 1/04* | (2006.01) | |
| *G06F 1/08* | (2006.01) | |
| *G06F 11/16* | (2006.01) | |

(52) U.S. Cl.
CPC ................. G06F 1/10 (2013.01); G06F 1/08 (2013.01); *G06F 1/04* (2013.01); *G06F 11/1604* (2013.01)

(58) Field of Classification Search
CPC ..... G06F 1/10; G06F 1/08; G06F 1/04; G06F 11/1604
USPC .................. 713/400, 500, 503; 714/798, 814
See application file for complete search history.

(56) References Cited

U.S. PATENT DOCUMENTS

| | | |
|---|---|---|
| 10,884,448 B1 | 1/2021 | Lan et al. |
| 2007/0255974 A1* | 11/2007 | Gilday .................... H03K 23/52 713/503 |
| 2008/0080658 A1* | 4/2008 | Huang .................... H03L 7/095 375/376 |
| 2008/0168338 A1* | 7/2008 | Lee ........................ H04L 1/0061 714/E11.032 |
| 2011/0133786 A1* | 6/2011 | Yamaoka ......... H03K 19/00346 327/97 |
| 2011/0311017 A1* | 12/2011 | Baumeister ............... G06F 1/10 377/39 |
| 2011/0317802 A1 | 12/2011 | Rohleder et al. |
| 2017/0277585 A1* | 9/2017 | Nakajima ........... G06F 11/0757 |
| 2017/0344438 A1* | 11/2017 | Bilgiday ................. G06F 11/26 |
| 2019/0379368 A1 | 12/2019 | Lin et al. |
| 2020/0081062 A1 | 3/2020 | Goh |
| 2021/0081528 A1 | 3/2021 | Hershman |

\* cited by examiner

*Primary Examiner* — Ji H Bae

(57) ABSTRACT

The present disclosure relates to a clock signal monitoring unit comprising first, second and third flip-flops, first and second XOR gates and a delay element being functionally interconnected in a specific way. The proposed clock signal monitoring unit can detect both a rising edge glitch and a falling edge glitch. In this way there is provided an area saving device, which does not require any trimming efforts, which can save a lot of space and time. Furthermore, the clock signal monitoring unit can have low electric power consumption because it uses as few as four clocked flip-flops implemented via Register Transfer Logic having an already tuned delay element. This makes it useful for designs that use both edges of the clock for correct operation.

9 Claims, 3 Drawing Sheets

CLOCK SIGNAL MONITORING UNIT

CROSS-REFERENCE TO RELATED APPLICATIONS

This application claims priority under 35 U.S.C. § 119 to European patent application no. 23168733.6, filed Apr. 19, 2023, the contents of which are incorporated by reference herein.

TECHNICAL FIELD

The present disclosure relates to a clock signal monitoring unit. Furthermore, the present disclosure relates to a method of operating a clock signal monitoring unit. Furthermore, the present disclosure relates to computer implemented methods for carrying out the proposed method.

BACKGROUND

Simulations have shown that a narrow glitch of around on a CPU clock can cause the CPU to misbehave. Therefore, digital logic is expected to be similarly disturbed by clock glitches. Conventional EMFI (electromagnetic fault injection) sensors, which can be used to detect clock glitches tend to be large, technology dependent, power hungry and require trimming for correct operation.

SUMMARY

It is an object to provide an improved monitoring device for detecting a clock glitch.

According to a first aspect of the present disclosure there is provided a clock signal monitoring unit comprising:
- a first flip flop and a second flip flop, the first flip flop and the second flip flop being cross-coupled, the first flip flop being clockable by a clock signal and the second flip flop being clockable by an inverted clock signal that is a complement of the clock signal, wherein outputs of the first and second flip flops are connected as inputs to a first XOR gate;
- a third flip flop being clockable by the clock signal and a fourth flip flop being clockable by the inverted clock signal;
- an output of the first XOR gate being connected to a delay element, the delay element being adapted to delay the output of the first XOR gate to a specified amount of time, wherein the specified amount of time stands in a defined relationship to a frequency of the clock signal;
- an output of the delay element being connected to the third flip flop and to the fourth flip flop;
- an output of the third flip flop and an inverted output of the fourth flip flop being connected as inputs to the second XOR gate; and
- an output of the second XOR gate being configured to provide a glitch detect signal.

In this way there is provided an area saving device, which does not require any trimming efforts, i.e. no trimming during production tests is necessary, which can save a lot of space and time. Furthermore, the unit has low electric power consumption, because it comprises only four clocked flip flops implemented via RTL (Register Transfer Logic) having an already tuned delay element. The proposed unit represents a shared unit for shortening of the high or low period of the clock. This makes it useful for designs that use both edges of the clock for correct operation. The clock glitch can result in a reduced clock high/low time or a addition rising or falling edge within the clock period.

According to a further aspect there is provided a method to operate a clock signal monitoring unit, comprising the steps:
- inputting a clock signal to cross coupled flip flops, wherein the first flip flop is clocked by the clock signal and the second flip flop is clocked by an inverted clock signal that is the complement of the clock signal;
- feeding output signals of the cross coupled flip flops to inputs of a first XOR gate;
- delaying an output signal of the first XOR gate by a specified amount of time, wherein the specified amount of time stands in a defined relationship to a frequency of the clock signal;
- outputting an output signal of the delay element to a third and fourth flip flop, respectively, wherein the third flip flop is clocked by the clock signal and the fourth flip flop is clocked by the inverted clock signal;
- checking whether at least the output signal of the third flip flop or the output signal of the fourth flip flop has changed its state; and
- in the case that at least the output of the third flip flop or at least the output of the fourth flip flop has changed its state, providing a glitch detection signal at an output of the second XOR gate.

According to a further aspect, there is provided a computer implemented method and a computer program product comprising executable instructions which, when executed by a signal clock monitoring unit causes said clock signal monitoring unit to carry out the proposed method.

According to one or more embodiments, the clock signal is connected to a clock signal of a device, which is clockable by the clock signal. In this way an effectivity to protect devices clocked by the clock signal may be enhanced.

According to one or more further embodiments, the output of the second XOR gate is connected to a flagging element, the flagging element being configured to improve a visibility of the glitch detect signal. In this way, a visibility of a glitch is improved and subsequent steps can be initiated.

According to one or more further embodiments, it output of the second XOR gate is connected to a set input of a fifth flip flop, the fifth flip flop having a back coupling of an output to an input, an output of the fifth flip flop being connected to a first AND gate, the first AND gate further being connected to an enable line. In this way, the fifth flip flop is forced to have a "High" on its output, wherein the flip flop can be cleared when it gets a reset.

According to one or more further embodiments, the clock signal monitoring unit further comprises an idle control unit, the idle control unit being configured to check whether the clock signal is fed or not to the clock signal monitoring unit and configured to pass through a system clock to the clock signal monitoring unit. Resulting therefrom, the unit does not consume power when the state is idle, which improves energy efficiency. In principle this is implemented via a latch functionality at the input.

According to one or more further embodiments, a time delay of the delay element is configured such that it relates to an expected frequency of the clock signal plus a defined threshold value. As a consequence, the sensitivity of the unit is designed to be robust to interference effects.

According to one or more further embodiments, a detection of a glitch on the clock signal is adapted to a worst case scenario as regards PVT, Process, Voltage, Temperature, conditions. In this way, the area of the unit can be further improved.

According to one or more further embodiments, the clock signal monitoring unit can be used for EMFI-protection.

According to one or more further embodiments, the clock signal monitoring unit can be used for supply voltage glitch protection.

According to one or more further embodiments, in the case that a glitch has been detected, a reset signal is generated. An improved operation of the device clocked by the clock signal is obtained, because a possible attack results in a restart of the boot routine.

BRIEF DESCRIPTION OF DRAWINGS

In the following, the term "clock signal" means a signal with a specified duty cycle which is used to clock electronic devices, e.g. a CPU, memory elements, etc.

The aspects defined above and further aspects of the present disclosure are apparent from the examples of embodiment to be described hereinafter with reference to the appended drawings, which are explained with reference to the examples of embodiment. However, the disclosure is not limited to the examples of embodiment.

Figure 1:
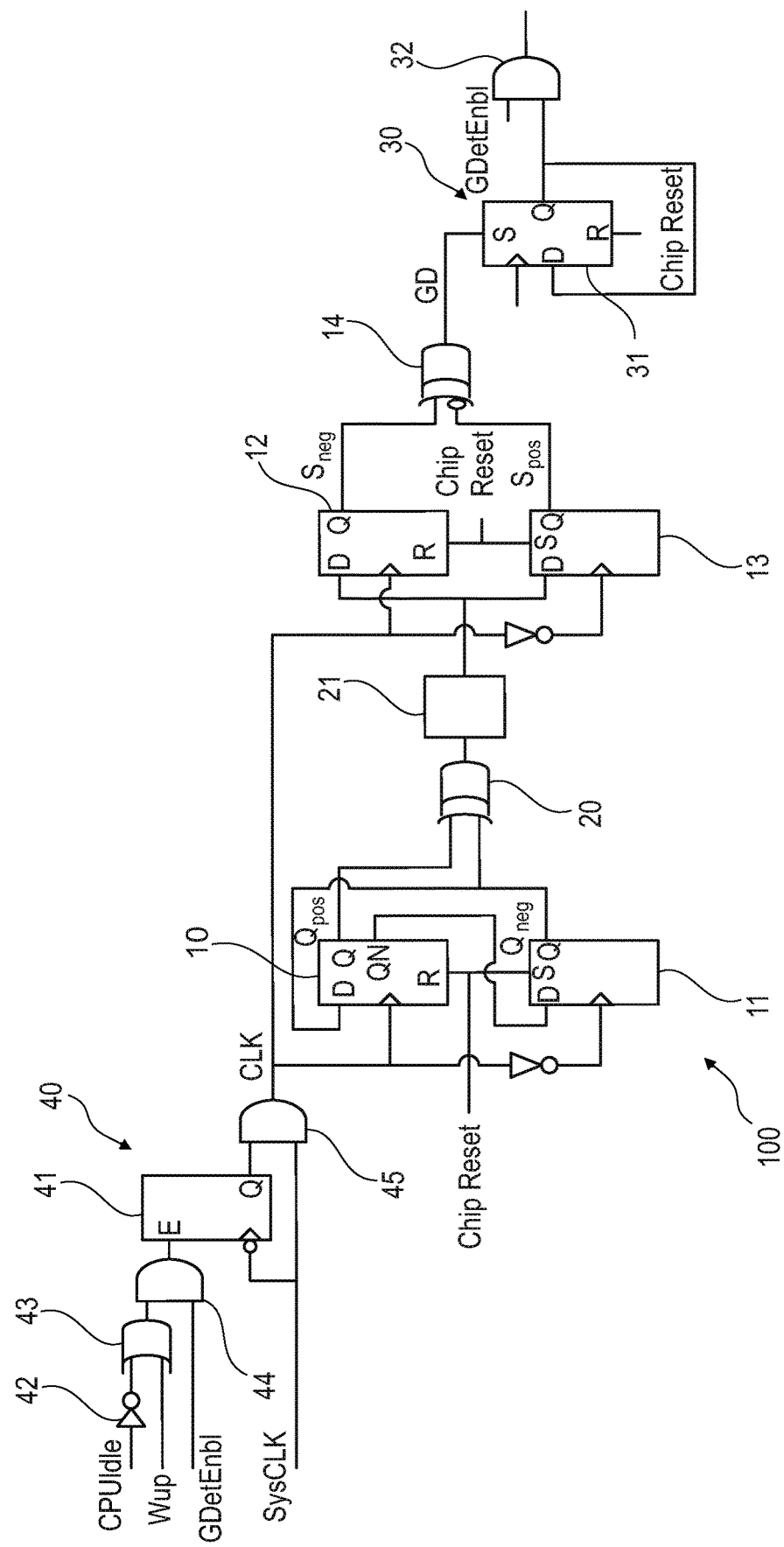

All illustrations in the drawings are schematical. It is noted, that in different figures, similar or identical elements or features are provided with the same reference signs or with reference signs, which are different from the corresponding reference signs only within the first digit. In order to avoid unnecessary repetitions elements or features which have already been elucidated with respect to a previously described embodiment are not elucidated again at a later position of the description.

Figure 2:
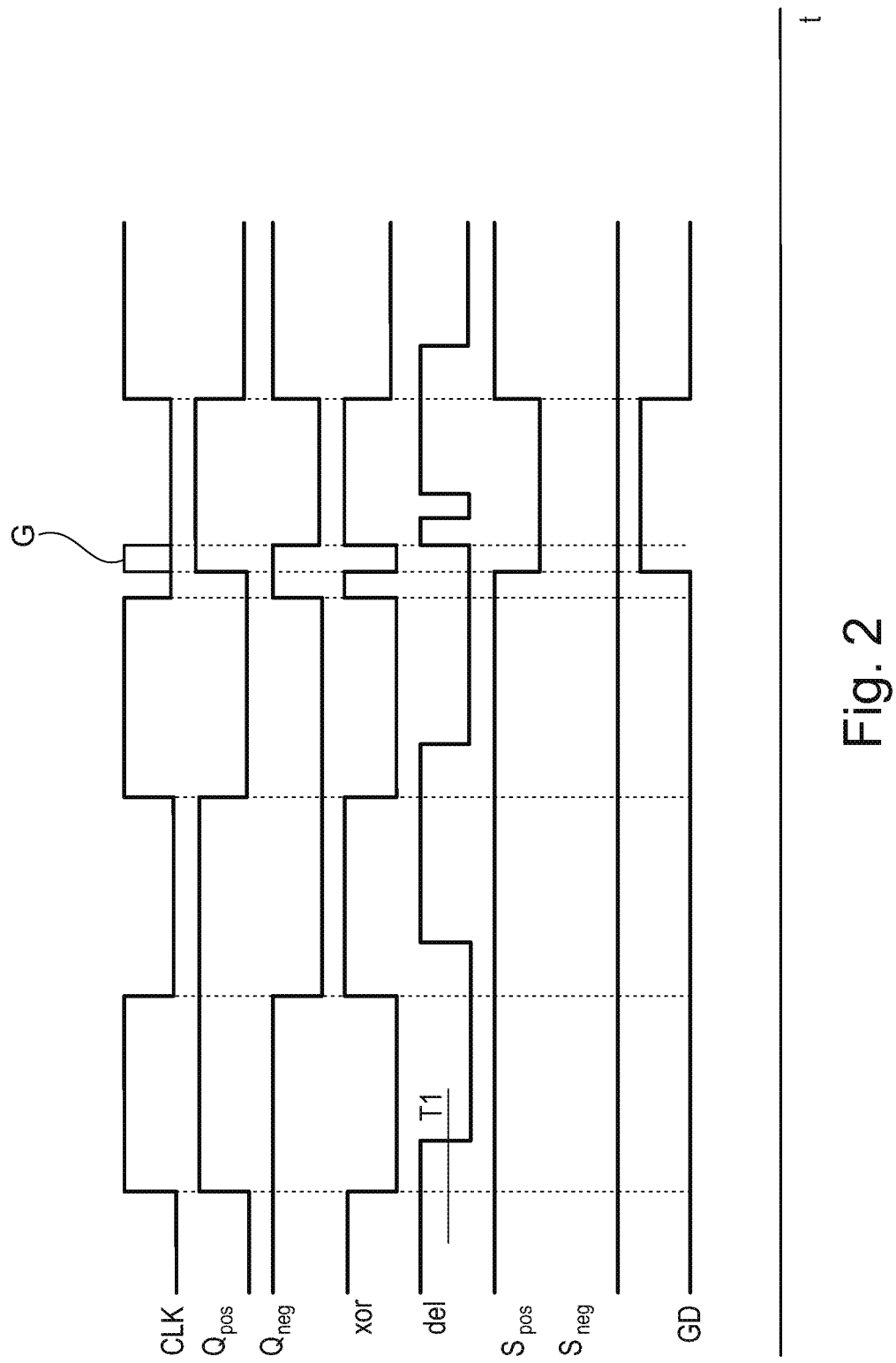

FIG. 1 shows a block diagram of an exemplary embodiment of a proposed clock signal monitoring unit;

FIG. 2 shows a timing diagram with signals of the proposed unit; and

Figure 3:
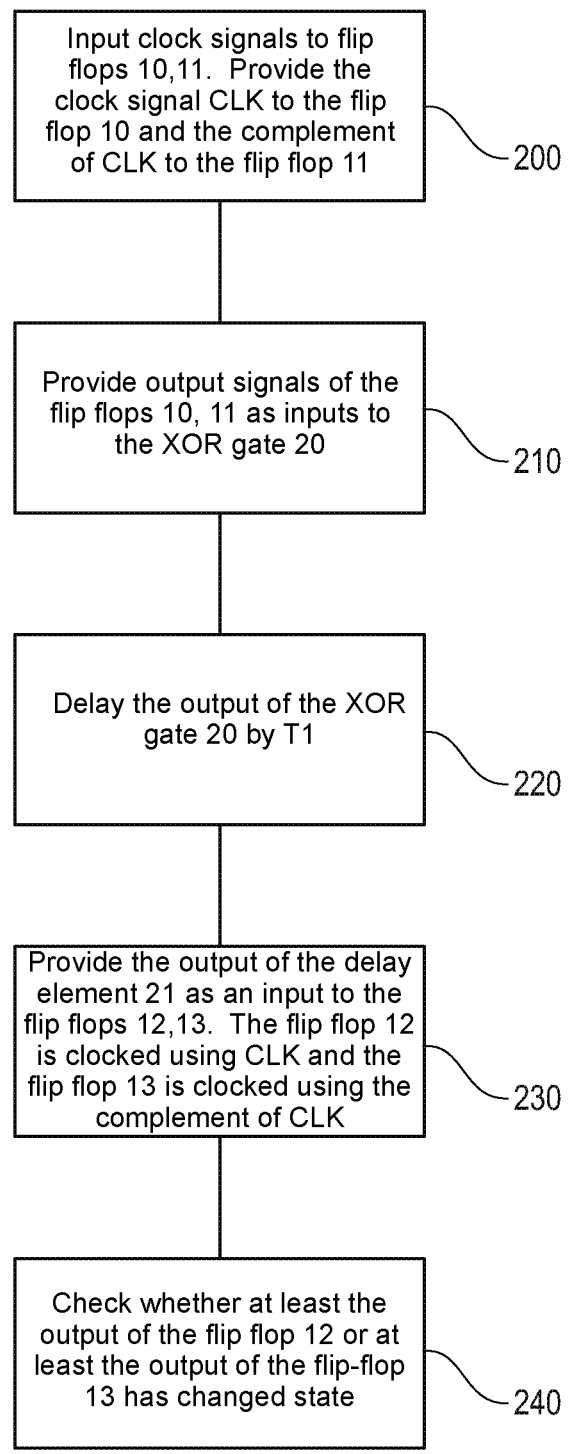

FIG. 3 shows a flow diagram of the proposed method.

DESCRIPTION OF EMBODIMENTS

In the following, the term "glitch" means a section of a clock signal with reduced duty cycle. E.g., if the clock signal has a frequency of 16 MHz and the clock signal changed its clock frequency to 50 MHz, this is interpreted as a clock frequency increase interpretated as a glitch.

The present disclosure proposes a clock signal monitoring unit, which requires only one delay module, which is very small, consumes low electric power and requires no trimming efforts. Moreover, the proposed unit is suitable for designs using both clock edges, i.e., a rising edge glitch and a falling edge glitch.

FIG. 1 shows a block diagram of a proposed clock signal monitoring unit 100. One recognizes a first flip flop 10 and a second flip flop 11, which are cross-coupled, thus feed into each other, wherein the first flip flop 10 is clocked by the clock signal CLK and the second flip flop 11 is clocked by a complement of the clock signal (hereinafter "the inverted clock signal"). Outputs of the first and second flip flops 10, 11 are connected as inputs to a first XOR gate 20. An output of the first XOR gate 20 is connected to a delay element 21, which delays the output of the first XOR gate 20 to a specific amount of time T1. An output of the delay element 21 is connected to a third flip flop 12 and to a fourth flip flop 13, wherein the third flip flop 12 is clocked by the clock signal CLK and the fourth flip flop 13 is clocked by the inverted clock signal CLK.

The delay element 21 is configured such that no false glitches are detected. Conventional glitch detectors have a trimmable delay, which is not necessary for the proposed clock signal monitoring unit 100.

The characteristics of the delay element 21 are adapted to a known or expected clock frequency (e.g. 16 MHz) plus a specified threshold (e.g. 10%). Therefore, it can be said that the maximum clock frequency which is expected should be 16 MHz+10%=17.6 MHz. If the clock frequency is higher than 16 MHz+10% then this is interpreted as the occurrence of a glitch G. This results in a time delay of the delay line 21 which is such dimensioned, that it relates to an amount of the expected clock frequency plus a defined threshold value giving it roubustness to interference effects. Moreover, as operations characteristic usually vary with ambient conditions, glitch sensitivity is set to worst case conditions with respect to "PVT" (Process, Voltage, Temperature).

In this way, also PVT circumstances are taken into account in order to provide an optimized operation characteristics of the clock signal monitoring unit 100. Usually, a behavior is slow under high temperature and low electric voltages (slow conditions) and is fast under low temperatures and high electric voltages (fast conditions). The delay element 21 takes these influences into account.

An output of the delay element 21 is connected to inputs of a third flip flop 12 and a fourth flip flop 13, respectively. An output of the third flip flop 12 is connected to a second XOR gate 14 and an inverted output of the fourth flip flop 13 is inverted and connected to the second XOR gate 14. The Qpos is clocked on the rising edge of the clock signal CLK, falls on the next rising edge of the clock signal CLK, and so on. In other words, the first flip flop 10 is a tracking of rising edge flip flop. The output signal Qneg of the second flip flop 11 is tracking the negative edge of the clock signal CLK.

In this way, an output of the second XOR gate 14 can be used to indicate a duty cycle of the clock signal CLK which has been at least once modified beyond the defined threshold.

If there are no glitches, what happens is that the flip flops beyond the delay element 21 will then take on the value from the delay and are being clocked by the clock signal CLK. If the delay is shorter than the actual clock, Sneg and Spos as output signals of a third and fourth flip flop 12, 13, respectively, will read exactly the same value which is coming out of the delay element 21. In effect, in normal operation Spos will remain high all the time and Sneg will remain low all the time. At the moment, where Spos and Sneg read different values, caused by a glitch G, this circumstance is fed to a second XOR gate 14. The detection signal GD detects a discrepancy in the two inputs Sneg and Spos to the second XOR gate 14. The detection signal GD goes into a set input of a fifth flip flop 31 and forces the fifth flip flop 31 to have a "high" on its output, which is reinforced by a Q to D back coupling, an output of the fifth flip flop 31 fed to a first AND gate 32 to produce a fail flag. The only way to get the flagging unit 30 cleared is to feed a chip reset on its reset input R. Once having been cleared, a new glitch G can be detected by the clock signal monitoring unit 100.

FIG. 2 shows a timing diagram of signals within the proposed clock monitoring unit 100. One recognizes, that the output of the second XOR gate 14 serves to indicate the glitch detection signal GD. The glitch detection signal GD is then flagged with a downstream flagging unit 30 which comprises a fifth flip flop 31 and a first AND gate 32 which is fed by the output of the fifth flip flop 31 and the signal GDetEnbl in order to flag the glitch detection signal GD, which otherwise would disappear with the disappearance of the glitch G.

Furthermore, one recognizes, that the input stage of the proposed clock signal monitoring unit 100 comprises an idle unit 40, which is intended to deactivate the proposed unit 100 in case that the clock signal CLK is not needed and is in an idle state.

The idle unit 40 comprises a CPU idle control unit with an inverter 42, which is fed by an idle signal CPUIdle and an OR gate 43 and a downstream clock gating unit with a second AND gate 44, a latch 41 and a third AND gate 44, which is fed by an enabling signal GDetEnbl. The CPU idle control is fed by a signal CPUidle and Wup (Wake up), which provides, that if the CPU goes into the idle mode. Then the CPU is waiting for a wake up, which is achieved by the signal Wup. The clock gating unit in principle provides the function of a latch and allows the clock signal SysCLK through when the signal GDetEnbl is high. If the GDetEnbl goes low, then the SysCLK is blocked and not fed to the core of the clock monitoring unit 100. In this way, the functionality of clock monitoring by means of the clock signal monitoring unit 100 is only active if desired or not deactivated and helps to save electric energy, which may be helpful in energy restricted technical areas. Such idling and CPU clock gating units are well known as such and are therefore not described in more detail hereinafter.

The idle unit 40 and clock gating unit generates the "gated" clock signal CLK out of the SysCLK signal. The SysCLK also goes to a device being driven with the SysCLK, e.g. a CPU (not shown). A glitch could cause a misbehaviour, invalid read/write of a memory location, etc.

The proposed clock signal monitoring unit 100 is able to test both edges of the clock signal CLK and does not require any means for calibration in order to trim the response. This results in a low-area design of the proposed clock signal monitoring unit 100. The proposed clock signal monitoring unit 100 is thus able to detect clock glitches as well as modification of the clock duty cycle. Furthermore, the unit comprises a shared delay unit, i.e. provides ability to monitor rising and falling edge glitches achieving a minimal area overhead. The optional IDLE control unit 40 provides ultra-low power consumption of the unit 100.

In this way, the proposed clock signal monitoring unit 100 is able to detect clock glitches as well as modification of the clock duty cycle. Moreover, the proposed unit 100 is able to reuse of the same delay chain for both halves of the clock and by this reducing the area required for the detector.

The proposed clock signal monitoring unit represents a kind of "worst case path detector", which is able to detect a changed duty cycle of the clock signal. In this way, e.g. an increase of the clock frequency ("glitch") can be detected and flagged.

In case no detection of clock glitch is required, we have an enable for activating low power (clock gating). In this way, an automatically clock gates itself off when CPU is in IDLE mode for low power operation.

Furthermore, in order to better see the error signal, a flagging element 30 (gated with the enable) is provided downstream.

The proposed signal clock monitoring unit 100 is able to detect modifications of the duty cycle of the monitored clock signal. By means of two flipflops 10, 11, which are clocked with positive and negative edge of the clock signal CLK respectively and a XOR gate 20, a signal toggling with each clock edge is generated. This is sent over a delay element 20 (e.g. delay line) and sampled with two flipflops 12, 13 running on positive and negative edge of the clock signal CLK respectively. Due to the double toggling, the sample flip flops 12, 13 will in normal case have a static value. If one of them changes its value this indicates an error in the clock signal CLK.

FIG. 2 shows by means of a signal diagram the behavior of the detector in case of a rising edge clock glitch. One recognizes the monitored clock signal CLK and output signals QPos, QNeg of the first flip 10 and the second flip-flop 11. Furthermore, an output signal of the first XOR gate 20 is shown, which is then delayed by the delay element number 21 by a specified length of time T1.

Furthermore, one recognizes the signals Sneg and Spos as output signals of the third and fourth flip-flop 12, 13, respectively.

In case, there is a glitch G on the clock signal CLK, the output of the first XOR gate 20 detects this event and the output signal Spos of the third flip flop 13 changes its state. Furthermore, as a result of this event, the output of the second XOR gate 14 also changes its states and thus indicates the existence of the glitch G on the clock signal CLK.

In addition to the main functionality of a "glitch detector core", the following enhancements were added. A clock gating unit was added to put the clock signal monitoring unit 100 into low power mode, when not used.

Signals from the interrupt wake-up source and CPU IDLE instruction were used to push the clock monitoring circuit into low power mode whenever the CPU goes to IDLE (and the CPU clocks are shut down). In addition, also a flagging unit 30 has been added for improved detection of glitch G.

The CPU source clock CLK used can vary and so in order to ensure that no trimming or auto-adjustment is required for different frequencies or PVT conditions, the maximum frequency plus a margin for oscillator variation and worst case PVT (slowest Process, minimum Voltage and maximum Temperature) shall be chosen for the Delay.

The following beneficial effects are possible:
Very small;
Low power consumption;
Technology-independent RTL apart from the delay cells (which need to calibrated for worst case PVT glitch protection);
No trimming required-fixed delay added to check for glitches that are small enough to damage correct CPU operation.

The proposed clock signal monitoring unit 100 is applicable for devices where there is a threat from EMFI-generated clock glitches, direct clock glitches or environmental disturbance impacting the clock signal or the propagation delay of the logic. E.g. it can be detected, whether a device is under attack with high electric voltage, e.g. an electromagnetic pulse generated by means of a coil in order to achieve misbehavior of the device. The CPU is generally a very vulnerable place for such attacks and can be protected by means of the proposed clock signal listening clock signal monitoring unit 100.

The proposed clock signal monitoring unit 100 can be implemented via Register Transfer Logic (RTL) source code, for defining the digital portions of a design, schematics or netlist. RTL is based on synchronous logic and contains three primary pieces namely, registers which hold state information, combinatorial logic which defines the next state inputs and clocks that control when the state changes. During operation, the proposed unit 100 under EMFI stress, a reset is triggered thus initiating a restart of the device from scratch. During CPU IDLE mode, the unit 100 is inactive and thus energy saving.

As a consequence of a glitch G having been detected, a reset can be given to the monitored device in order to initiate a new boot routine, thus eliminating any bad effects of the glitch. A sensitivity is such that normal effects with no detrimental effects are not detected, e.g. interference with other devices in noisy environments.

Although not shown, the proposed method performed with the proposed clock signal monitoring unit 100 can also detect falling edge glitches on the clock signal.

FIG. 3 shows a flow diagram of the proposed method to operate a clock monitoring unit 100.

In a step 200 a clock signal CLK is input to cross coupled flip flops 10, 11. The flip flop 10 is clocked by the clock signal CLK and the flip flop 11 is clocked by the complement of the clock signal CLK ("the inverted clock signal").

In a step 210 output signals of the cross coupled flip flops 10, 11 are provided as inputs to a first XOR gate 20.

In a step 220 an output signal of the first XOR gate 20 is delayed by a specified amount of time T1, wherein the specified amount of time T1 stands in a defined relationship to a frequency of the clock signal CLK.

In a step 230 an output signal of the delay element 21 is output to a third and fourth flip flop 12, 13, respectively, wherein the third flip flop 12 is clocked by the clock signal CLK and the fourth flip flop 13 is clocked by the inverted clock signal CLK.

In a step 240 it is checked whether at least an output signal of the third flip flop 12 or the at least an signal of the fourth flip flops 13 has changed state, wherein in case, that at least an output of the third or the fourth flip flop 12, 13 has changed its state, providing a glitch detection signal GD at an output of the second XOR gate 14.

An EMFI attack on a device can manifest itself as a clock glitch. The present disclosure describes a semiconductor area optimized detector to look for these kinds of disturbances and reset the device should they occur.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer readable medium, which may include storage devices and signals, in compressed or uncompressed form. As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, or any circuit that stores digital information.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document. Moreover, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

It has to be noted that embodiments have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this application.

REFERENCE SIGNS

10 $1^{st}$ flip flop
11 $2^{nd}$ flip flop
12 $3^{rd}$ flip flop
13 $4^{th}$ flip flop
14 $2^{nd}$ XOR gate
20 $1^{st}$ XOR gate
21 delay element
30 flagging element
31 $5^{th}$ flip flop
32 $1^{st}$ AND gate
40 idle unit
41 latch
42 inverter
43 OR gate
44 $2^{nd}$ AND gate
45 $3^{rd}$ AND gate 100 device
200 . . . 240 method steps
CLK clock signal
G glitch
T1 time delay

The invention claimed is:

1. An electronic circuit configured to detect a timing glitch in a digital clock signal, the circuit comprising:
a first flip-flop having a first data input, a first flip-flop output, a complementary output; and a first clock signal input configured to receive the digital clock signal;
a second flip-flop having a second data input, a second flip-flop output, and a second clock signal input configured to receive an inverted clock signal that is a complement of the digital clock signal;
a third flip-flop having a third data input, a third flip-flop output; and a third clock signal input configured to receive the digital clock signal;
a fourth flip-flop having a fourth data input, a fourth flip-flop output, and a fourth clock signal input configured to receive the inverted clock signal;
a first XOR gate configured to generate a first XOR output corresponding to an XOR of the first flip-flop output with the second flip-flop output;
a delay element having an input and an output, the delay element configured to produce a delayed output signal corresponding to the first XOR output that is delayed by an amount of time equal to a predetermined fraction of a period of the digital clock signal;
wherein the complementary output is coupled to the second data input of the second flip-flop, and the second flip-flop output is coupled to the first data input of the first flip-flop;
wherein the delayed output signal is coupled to the third data input of the third flip-flop and to the fourth data input of the fourth flip-flop;
wherein the electronic circuit further comprises a second XOR gate configured to generate a second XOR output corresponding to an XOR of the third flip-flop output with a complement of the fourth flip-flop output; and
wherein a value of the second XOR output indicates whether the timing glitch has occurred in the digital clock signal.

2. A method of detecting a timing glitch in a digital circuit, the method comprising:
providing a clock signal to a clock signal input of a first flip-flop;
providing an inverted clock signal that is a complement of the clock signal to a clock signal input of a second flip-flop;
providing a first output of the first flip-flop as an input to the second flip-flop and providing an output of the second flip-flop as an input to the first flip-flop;
providing a second output of the first flip-flop and the output of the second flip-flop as first and second inputs to a first XOR gate configured to generate a first XOR output corresponding to an XOR of the second output of the first flip-flop with the output of the second flip-flop;
providing the first XOR output as an input to a delay element configured to produce a delayed output signal corresponding to the first XOR output, wherein the delayed output signal corresponds to a version of the first XOR output that is delayed by an amount of time equal to a predetermined fraction of a period of the clock signal;
providing the delayed output signal as a data input to a third flip-flop that is clocked using the clock signal, and providing the delayed output signal as a data input to a fourth flip-flop that is clocked using the inverted clock signal;
providing an output of the third flip-flop and an output of the fourth flip-flop as first and second inputs to a second XOR gate configured to generate a second XOR output corresponding to a XOR of the output of the third flip-flop with a complement of the output of the fourth flip-flop; and
wherein the second XOR output is configured to produce a glitch detection signal that has a first value indicating that the timing glitch is detected and that has a second value indicating that the timing glitch has not been detected.

3. A clock signal monitoring unit, comprising:
a first XOR gate with a first XOR input, a second XOR input, and a first XOR output;
a second XOR gate having a third XOR input, an inverted XOR input, and a second XOR output that is configured to provide a glitch detect signal having a value that indicates whether a glitch has been detected in a clock signal;
a first flip-flop having a first data input, a first flip-flop output coupled to the first XOR input of the first XOR gate, a complementary output, and a first clock signal input, wherein the first flip-flop is configured to be clocked through the first clock signal input by the clock signal;
a second flip-flop having a second data input coupled to the complementary output, a second flip-flop output coupled to the first data input and to the second XOR input of the first XOR gate, and a second clock signal input, wherein the second flip-flop is configured to be clocked through the second clock signal input by an inverted clock signal that is a complement of the clock signal;
a third flip-flop that is configured to be clocked by the clock signal, wherein the third flip-flop has a third data input and a third flip-flop output, wherein the third flip-flop output is connected to the third XOR input of the second XOR gate;
a fourth flip-flop that is configured to be clocked by the inverted clock signal, wherein the fourth flip-flop has a fourth data input and a fourth flip-flop output, wherein the fourth flip-flop output is connected to the inverted XOR input of the second XOR gate; and
a delay element connected to the first XOR output of the first XOR gate, wherein the delay element has a delay element output connected to the third data input of the third flip-flop and to the fourth data input of the fourth flip-flop, and the delay element is configured to delay a signal produced at the first XOR output of the first XOR gate by a specified amount of time, wherein the specified amount of time is a predetermined fraction of a period of the clock signal.

4. The clock signal monitoring unit of claim 3, wherein the second XOR output of the second XOR gate is connected to a flagging element configured to produce a flag corresponding to the glitch detect signal.

5. The clock signal monitoring unit of claim 3, further comprising:
a fifth flip-flop having a set input connected to the output of the second XOR gate, the fifth flip-flop having a back coupling of an output of the fifth flip-flop to an input of the fifth flip-flop;

a first AND gate connected to an output of the fifth flip-flop; and an enable line connected to the first AND gate.

6. The clock signal monitoring unit according to claim 3, further comprising an idle control unit, the idle control unit being configured to check whether the clock signal is fed or not to the clock signal monitoring unit and configured to pass through a system clock to the clock signal monitoring unit.

7. The clock signal monitoring unit of claim 3, wherein the specified amount of time by which the delay element delays the output of the first XOR gate is configured such that the specified amount of time relates to an expected frequency of the clock signal plus a defined threshold value.

8. The clock signal monitoring unit of claim 4, wherein the flagging element comprises:

a fifth flip-flop with a set input connected to the second XOR output of the second XOR gate, a fifth data input, and a fifth flip-flop output coupled to the fifth data input; and a first AND gate with a first AND gate input connected to the fifth flip-flop output, a second AND gate input configured to receive an enable signal, and an AND gate output configured to produce the flag.

9. The clock signal monitoring unit of claim 6, wherein the idle control unit comprises:

an inverter configured to receive an idle signal from a central processing unit (CPU) that indicates that the CPU is in an idle mode, wherein the inverter is further configured to produce an inverted idle signal based on the idle signal; and a clock gating unit configured to receive the inverted idle signal and an enable signal, wherein the clock gating unit is further configured to operate as a latch that produces the clock signal in response to the enable signal.

* * * * *